No. 786,639.

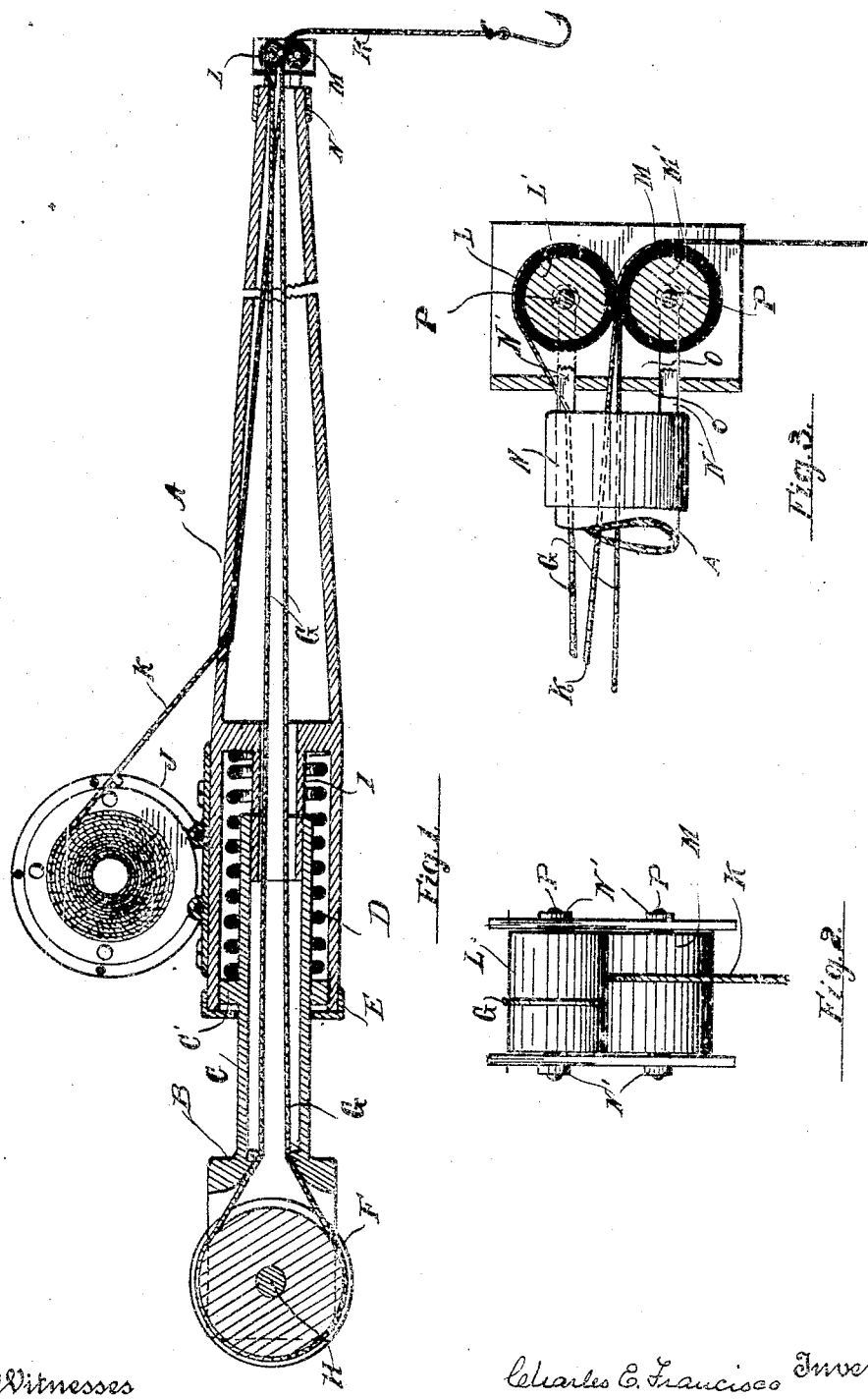

Patented April 4, 1905.

UNITED STATES PATENT OFFICE.

CHARLES E. FRANCISCO, OF LOWELL, MICHIGAN.

DEVICE FOR EXTENDING LINES FROM HOLLOW FISHPOLES.

SPECIFICATION forming part of Letters Patent No. 786,639, dated April 4, 1905.

Application filed December 20, 1904. Serial No. 237,688.

*To all whom it may concern:*

Be it known that I, CHARLES E. FRANCISCO, a citizen of the United States, residing at Lowell, in the county of Kent and State of Michigan, have invented new and useful Improvements in Devices for Extending Lines from Hollow Fishpoles, of which the following is a specification.

This invention relates to certain new and useful improvements in fishing-rods; and the invention consists in the mechanism for feeding or extending the line positively and also for combining a line-feed with a reel for withdrawing the line when extended.

The objects of the invention are, first, to furnish a positive means for extending or feeding the line from a fishing-reel; second, to combine with a fishing-reel a feed which will move the line outwardly from the tip of the pole by unwinding the line from the reel, the reel being used to wind the line in in the ordinary manner; third, other objects hereinafter shown and described. These objects I accomplish by means of the mechanism illustrated in the accompanying drawings, in which—

Figure 1 is a longitudinal sectional view of a fish-rod constructed in accordance with my invention and illustrating the means for extending the line from the tip of the pole and also for winding the same up on the reel. Fig. 2 is a front end view of the rollers which feed the line outwardly, the same being shown on an enlarged plan. Fig. 3 is a side elevation of the ferrule which supports the rollers and a sectional view of the rollers and yoke, the same being shown on an enlarged plan.

A is the outer shell or case of a fishing-rod constructed in accordance with my preferred form, the same being hollow during the whole or greater part of its length.

B is the handle or handpiece of the fishing-rod, secured to the rod in any suitable manner and provided with a projection C extending into the inside of the pole A. The portion C has an enlarged part C', which forms a shoulder against which the tension-spring D abuts, as fully shown in Fig. 1.

E is a cap fitting over and securing the rod in place upon the handle.

D is a spring fitting against a shoulder C' of the handle and also against a shoulder in the rod itself for the purpose of keeping the band-cord G always taut, so as to always be operated for the purpose hereinafter described.

F is a pulley or wheel for the band-cord G. The band-cord G passes over the pulley F and also over one of the friction feed-rollers at or near the tip of the rod. The hand-wheel F is mounted upon a spindle or journal H. The inner end of the pulley is provided with a projection I, which is adapted to telescope into the projection of the handpiece, as shown in Fig. 1.

J is a reel of any ordinary construction used for winding up the fish-line K. In the example of my invention shown in the drawings the line K is wound upon the reel J, having the front or hook end passing into the rod and extended to the tip of the rod, passing between the rollers L and M.

L and M are two feed-rollers, preferably covered with rubber in order to engage positively with the line K and to feed the same outwardly when the rollers are revolved by means of the cord G through the revolution of the wheel F. The center parts of the rollers L and M are shown by L' and M'.

N is a ferrule or cap on the tip of the pole, which is provided with the arms N' N', extending outwardly and supporting the yoke O. The yoke O is preferably made of metal bent in shape to support the journal-pins P P of the rollers L and M. The pins P P may be, if desired, supported by the arms N' N'.

The cord G in the example of the invention shown in the drawings passes over the friction feed-roller L, as shown more fully in Fig. 2. It, however, may be connected in any way to the feed-rollers. By this construction the line K is fed outward positively by revolving the wheel F, the spring always keeping the band-cord G sufficiently strained to positively operate the feed-rollers L and M. The line after being extended may be wound in in the ordinary manner upon the reel J.

A fishing-rod constructed in accordance with my invention may be used in any place where still-fishing is done and is peculiarly adapted to trout-fishing in small streams obstructed by brush and bushes, the construction enabling the user of the rod to reach the deep pools along small streams, where the trout are most liable to be found.

I have described my preferred form of drawing in the line by means of a reel. I do not, however, wish to confine myself to this particular form of reel, as the line may be drawn in in any suitable manner, and the wheel used to extend the line may be used also as a reel, if desired.

Having thus described my invention, what I claim to have invented, and desire to secure by Letters Patent, is—

1. A fishing-rod, including a hollow pole, a handle movably mounted within said pole and having a pulley, a reel on said pole, feed-rollers at the end of said pole, a line on said reel engaging the pulley and said feed-rollers, and a tension device within the pole and coöperating with the handle for holding the said line taut.

2. A fishing-rod, including a hollow pole and handle adapted to slidably engage one another, the pulley carried by the handle, feed-rollers on said pole, a reel having a line engaging the pulley and feed-rollers and passing interiorly of the pole, and means coöperating with the pole and handle for keeping the line taut.

3. A fishing-reel, including hollow sections slidably engaging one another, a pulley carried by one of the sections, feed-rollers on the other section, a reel on one of the sections, a line on said reel and adapted to pass through the sections for engaging the pulley and the said feed-rollers, tension means coöperating with the sections for keeping the line taut.

4. In a fishing-rod having a hollow section, a combination of a movable handle mounted within said hollow section, a pulley carried by said handle, feed-rollers mounted at the end of said rod, a reel having a line adapted to be fed through the hollow section and engage the pulley and feed-rollers, and tension means engaging the handle and the rod to retain the line taut.

In testimony whereof I have hereunto set my hand in presence of two subscribing witnesses.

CHARLES E. FRANCISCO.

Witnesses:
EDWARD TAGGART,
MARY S. TOOKER.